United States Patent [19]
Suzuki et al.

[11] 3,953,626
[45] Apr. 27, 1976

[54] COATING METHOD

[75] Inventors: Motoaki Suzuki; Hitoshi Muroi, both of Tokyo, Japan

[73] Assignee: Toyo Ink Manufacturing Company, Ltd., Tokyo, Japan

[22] Filed: Dec. 26, 1973

[21] Appl. No.: 428,572

[30] Foreign Application Priority Data
Dec. 23, 1972    Japan.............................. 47-128841
Oct. 19, 1973    Japan.............................. 48-116865

[52] U.S. Cl................................ 427/346; 118/63; 264/93; 264/134; 427/348; 427/358; 427/425
[51] Int. Cl.² .......................................... B05D 3/04
[58] Field of Search............... 117/94, 105.4, 104 R, 117/104 B; 118/63, 32, 322; 239/426; 425/72; 65/60; 427/348, 425, 358, 346; 264/93, 129, 134

[56] References Cited
UNITED STATES PATENTS

| | | | |
|---|---|---|---|
| 1,281,672 | 10/1918 | Schorn................................. | 118/321 |
| 2,088,542 | 7/1937 | Westin ................. | 104 R X/104 R X |
| 2,583,220 | 1/1952 | Lanigan .............................. | 427/348 |
| 3,038,823 | 6/1962 | Currant et al. ................. | 427/348 X |
| 3,129,112 | 4/1964 | Marvin............................. | 239/426 X |
| 3,141,194 | 7/1964 | Jester................................. | 118/63 X |
| 3,277,227 | 10/1966 | Kesseler et al................... | 425/72 X |
| 3,294,058 | 12/1966 | Shriro ............................. | 239/426 X |
| 3,459,891 | 8/1969 | Ladney ................................ | 118/63 |
| 3,478,969 | 11/1969 | Lund................................. | 118/63 X |
| 3,713,867 | 1/1973 | Parkinson et al................. | 117/94 X |
| 3,739,747 | 6/1973 | Sullivan ......................... | 118/321 X |
| 3,783,823 | 1/1974 | Sievert et al......................... | 118/63 |

FOREIGN PATENTS OR APPLICATIONS 28,001    1912    United Kingdom.............. 117/105.2

Primary Examiner—Ronald H. Smith
Assistant Examiner—Stuart D. Frenkel
Attorney, Agent, or Firm—Sughrue, Rothwell, Mion, Zinn & Macpeak

[57] ABSTRACT

A method for coating a paint of high viscosity, wherein the paint is extruded in a filament-like form from a nozzle and is applied to a moving surface in a striped or convoluted pattern, and a gas is blown against the coated surface to smoothen it.

1 Claim, 3 Drawing Figures

COATING METHOD

BACKGROUND OF THE INVENTION

1. Field of the Invention

This invention relates to a method for obtaining a smooth coated surface rapidly using a paint of high viscosity.

2. Description of the Prior Art

Reactive curable paints comprising a prepolymer, a curing agent, and a promotor have recently gained widespread acceptance because of their superior properties, and much interest exists in those paints which do not contain any solvent since they are substantially hazard-free. Many of the solvent-free paints, however, have a high viscosity, and cannot be applied using conventional methods such as brush coating, roll coating or spray coating. Even when coating can be accomplished using such a method, it is difficult to obtain a smooth coated surface.

SUMMARY OF THE INVENTION

This invention is an outcome of research conducted to obtain a smooth coated surface using a paint of high viscosity, and provides a method wherein a paint of high viscosity is applied to a surface by extruding from a nozzle, etc. and the coated surface is smoothened by, for example, blowing a gas against it.

BRIEF DESCRIPTION OF THE ACCOMPANYING DRAWINGS

DETAILED DESCRIPTION OF THE INVENTION

Figure 1:
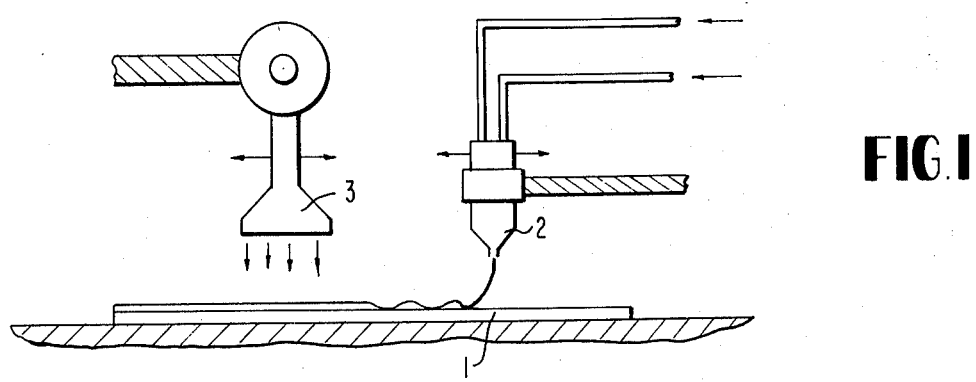
FIG. 1 is a view illustrating one example of the method of this invention.

The paint is extruded from nozzles in the form of filaments onto the surface. However, the coated surface is uneven since the amount of paint varies across the surface to be coated. By blowing a gas againt the coated surface and spreading the paint on the surface of the coating due to the resulting gas pressure, the paint in the lines is spread and fills in the areas between the paint lines thereby to form a smooth coated surface. Where the coated surface is maintained vertical, the coated surface can also be smoothened by rotation.

According to the present invention, a paint of high viscosity e.g., having a viscosity of about 10,000 to 250,000 cps at 20°C, can be applied to form a smooth coated surface, and a paint having a high curing speed can be quickly applied to form a smooth coated surface before curing occurs. Furthermore, since the coating is applied by extruding to the surface and smoothened by applying a gaseous pressure or a centrifugal force, etc. to it after application of the paint, a smooth coated surface can be obtained irrespective of whether the original surface is rough or smooth.

The present invention makes it easy to use solvent-free paints that do not cause pollution, and thus has a wide range of utilities. It is especially useful for applying a protective coating on bottles.

A paint is extruded from at least one nozzle and applied to a moving surface. The nozzle can also be moved while the surface is maintained stationary. The movement can be, for example, a parallel movement, a rotational movement or a reciprocating movement of the surface to be coated in relation to the nozzle. When the material to be coated is in a ribbon-like form, a number of nozzles are aligned along its entire width and the surface to be coated or the nozzle is moved in a longitudinal direction. In the case of a bottle, it is placed horizontally and rotated about its long axis, and the nozzles are moved along the length of the bottle to apply a paint to the surface of the bottle in the form of helical filaments. Alternatively a number of nozzles can be arranged along the entire width of the bottle, and the paint extruded through the nozzles onto the surface of the rotating bottle to form a striped coated surface.

When a perpendicular surface such as the bottom surface of the bottle is coated, the bottle is rotated about its longitudinal axis. Simultaneously the paint is extruded onto a position near the bottom surface and a gas is blown against the filament of paint to deflect the paint stream towards the surface to be coated and thereby adhere the paint to the surface and form a coated surface.

The gas to be blown against the coated surface to smoothen is usually air, nitrogen gas or carbon dioxide gas, but can be other gases which do not adversely affect the properties of the paint. Exhaust gases can also be used.

It is necessary to blow a gaseous stream under uniform pressure against the coated surface, and a nozzle having one or a plurality of jet openings of a circular or slit shape, etc. can be used.

The pressure of the blowing gas is such that the paint on the surface of the coating is blown and spread, and gases under a pressure of about 0.5 $Kg/cm^2$ to 5 $Kg/cm^2$, preferably 1 $Kg/cm^2$, obtainable by using a conventional air blower are employed.

The gas can be blown against the coated surface at an angle of 30° to 90° to the coated surface, and the distance between the exit of blowing nozzle and the coated surface can be as near as possible, usually 0.5 to 2 cm.

The coating efficiency can also be enhanced by warming at about 50° to 100°C the paint, the surface to be coated or the gas to be blown. In addition where desired any two of these can be warmed or all these can be warmed.

The invention will be further described by reference to the accompanying drawings.

Referring now to FIG. 1, a paint is extruded in a filament form from a coating means 2 with a nozzle onto a surface 1 to be coated. The coating means is moved reciprocally while moving the coating means to the left and right to form a coated surface. A gas is blown against the coated surface from a means 3 for blowing a gas which includes a gas jet opening thereby to smoothen the coated surface. The blowing means can also be moved reciprocally and/or to the left and right.

Figure 2:
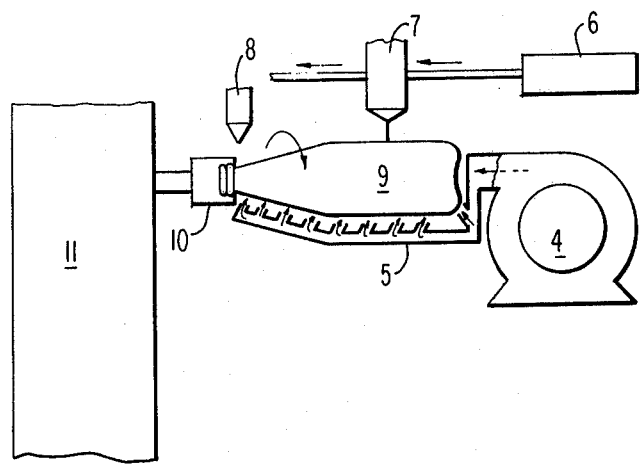
FIG. 2 is a view illustrating one embodiment of the apparatus of this invention.

The application of the method of this invention to bottles is shown in FIG. 2. A bottle 9 is maintained in a horizontal position by a chuck 10 provided in a conveyor 11, and a paint is extruded down onto its surface from a nozzle of a coating means 7. The coating means 7 is moved by a moving means 6 to form a convoluted pattern on the surface of the bottle 9. Air is then blown against the coated surface by a blowing means 5 having an air jet opening thereby to smoothen the surface. The reference numeral 8 represents an air curtain excluding a region that does not require coating.

Figure 3:
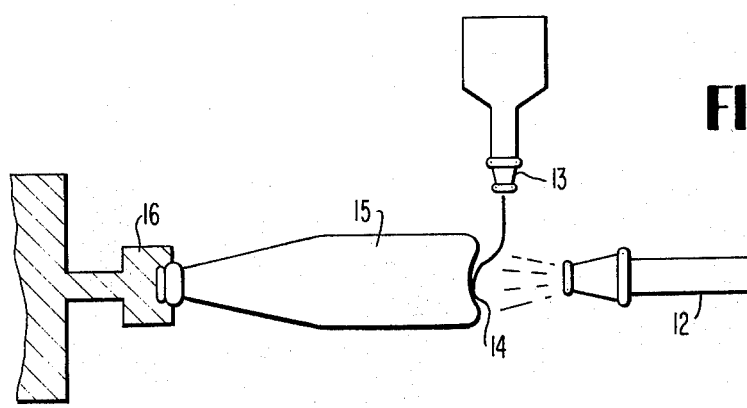
FIG. 3 is a view illustrating the method of this invention as applied to the coating of the bottom surface of a bottle.

Referring to FIG. 3, a paint is flowed down from a nozzle 13 and passed near a bottom surface 14 of a bottle 15 which is being rotated and maintained in position by means 16. A gas blown against the flowing paint through a blow nozzle 12 to cause the paint to adhere to the bottom surface 14 of the bottle in a convoluted pattern. By rotating the bottle using a means not shown, the coating is spread over the entire bottom surface to form a coating of a uniform thickness. The use of this procedure in conjunction with the method shown in FIG. 2 is especially effective for continuously coating bottles. Specifically, if the nozzle 7 in FIG. 2 is moved beyond the bottom of the bottle and to the same position shown for the nozzle 13 in FIG. 3, and the same gas blowing nozzle as shown in FIG. 3 is used, the coating of the bottom surface can be accomplished subsequent to the method of FIG. 2.

The following Examples are given to illustrate the present invention in greater detail. Unless otherwise indicated, all parts and percents are by weight.

EXAMPLE 1

A paint was prepared by mixing 40 parts of a prepolymer (SL-2, a reactive curable polyether-polyol/urethane paint produced by Toyo Ink Mfg., Co., Ltd.) with 20 parts of a curing agent for the prepolymer while heating at 40°C. The resulting paint had a viscosity of 14,000 centipoises at 20°C. The paint was heated to about 70°C., and applied through a nozzle in a filament-like form and in a convoluted pattern to the surface of a beer bottle having a capacity of 633 ml. and preheated to about 100°C. The amount of the paint applied was 10 g. Warm air at about 60°C was blown against this surface. The warm air was supplied from an air blower having a maximum air flow rate of 8 m³/min. at an air pressure of 580 mmHg and was heated using an electric heater. The air was blown against the coated surface from a distance of 1 cm using a blowing device having 10 circular jet openings, each with a diameter of 1 cm. A smooth coated surface with a finished coating thickness of about 200 microns was obtained.

EXAMPLE 2

In the same way as described in Example 1, the surface of the body of a beer bottle was coated. Then, the nozzle for extruding the paint was moved beyond the bottom of the bottle, and the paint was flowed for about 5 seconds at a position 2 cm from the bottom surface of the bottle. Air under a pressure of 0.2 Kg/cm² was blown from an air jet opening with an inside diameter of 5 mm against the bottom of the bottle to cause the paint to form a convoluted pattern and to adhere to the surface of the bottom. Rotation of the bottle led to the formation of a coating of uniform thickness all over the bottom surface.

EXAMPLE 3

An aluminum plate (length 50 cm, width 30 cm, thickness 0.7 mm) was preheated to 170°C. About 15 g of the same paint as that used in Example 1 was coated on the surface of the aluminum plate held horizontally through a nozzle placed at a distance of 3 cm from the plate. Hot air at 100°C. was blown against the coated surface at a blow angle of 45° in the same way as described in Example 1 to form a smooth coated surface having a coating thickness of about 100 microns.

EXAMPLE 4

44.9 g of the polyol component of SLN-1 (a reactive curable polyester-polyol urethane resin paint manufactured by Toyo Ink Mfg., Co., Ltd.) was kneaded with 5 g of Oriental Fast Red FB New (a red pigment manufactured by Toyo Ink Mfg., Co., Ltd.), and 52.7 g of the isocyanate component of SLN-1 was mixed with the resulting kneaded mixture, followed by adding 1 g of a 1% methyl ethyl ketone solution of dibutyl tin dilaurate as a catalyst thereby to form a paint having a viscosity of 10,000 centipoises at 20°C. 15 g of this paint was coated on a fabricated plastic plate (length 50 cm, width 30 cm) preheated to 100°C., in the same way as described in Example 3 to form a smooth coated surface.

EXAMPLE 5

The same paint as used in Eample 1 was coated on the surface of a plywood sheet (length 50 cm, width 30 cm) in the same way as described in Example 3 to form a smooth coated surface.

Furthermore, a similar smooth coated surface was obtained when a styrene/butadiene rubber plate was coated in the same way.

While the invention has been described in detail and with reference to specific embodiments thereof, it will be apparent to one skilled in the art that various changes and modifications can be made therein without departing from the spirit and scope thereof.

What is claimed is:

1. A method for coating bottles, which comprises rotating a bottle about its longitudinal axis while maintaining said axis horizontal, extruding a high viscosity paint in filament-like form from a nozzle positioned about said bottle and at the same time moving said nozzle along the length of said bottle from a position above the neck of said bottle to a position above said bottle but beyond the bottle bottom thereby to form a coating on the surface of the body surface of said bottle, blowing a gas against the filament of paint when said nozzle has moved to said position beyond the bottle bottom to cause the filament to flow towards said bottle bottom and adhere to the bottom surface of said bottle to form a coated surface on said bottom surface, and then smoothening the coated surfaces of the body and bottom surfaces of the bottle by blowing a gas against the surface of said paint coating.

* * * * *